US011905153B2

(12) United States Patent
Stolten et al.

(10) Patent No.: US 11,905,153 B2
(45) **Date of Patent: *Feb. 20, 2024**

(54) INDUSTRIAL TRUCK, HYDRAULIC SYSTEM FOR AN INDUSTRIAL TRUCK AND METHOD FOR OPERATING A HYDRAULIC SYSTEM

(71) Applicant: Jungheinrich AG, Hamburg (DE)

(72) Inventors: Thomas Stolten, Tremsbüttel (DE); Michael Knieriem, Bad Oldesloe (DE)

(73) Assignee: Jungheinrich AG, Hamburg (DE)

( * ) Notice: Subject to any disclaimer, the term of this patent is extended or adjusted under 35 U.S.C. 154(b) by 0 days.

This patent is subject to a terminal disclaimer.

(21) Appl. No.: 17/867,209

(22) Filed: Jul. 18, 2022

(65) Prior Publication Data

US 2022/0348447 A1 Nov. 3, 2022

Related U.S. Application Data

(63) Continuation of application No. 16/132,568, filed on Sep. 17, 2018, now Pat. No. 11,427,451.

(30) Foreign Application Priority Data

Sep. 20, 2017 (DE) ..................... 10 2017 121 818.1

(51) Int. Cl.
*B66F 9/22* (2006.01)

(52) U.S. Cl.
CPC ......... *B66F 9/22* (2013.01); *F15B 2211/4053* (2013.01); *F15B 2211/71* (2013.01)

(58) Field of Classification Search
CPC ..................................... B66F 9/08; B66F 9/22
See application file for complete search history.

(56) References Cited

U.S. PATENT DOCUMENTS

| | | | |
|---|---|---|---|
| 3,871,266 A | 3/1975 | Schwab et al. |
| 5,115,720 A | 5/1992 | Babson et al. |
| 5,330,032 A | 7/1994 | Warner |
| 5,657,834 A | 8/1997 | Plaugher et al. |
| 10,604,391 B2 | 3/2020 | Yahner et al. |
| 2004/0003589 A1 | 1/2004 | Johansson et al. |
| 2005/0263354 A1 | 12/2005 | Perkins |
| 2007/0089934 A1 | 4/2007 | Finke et al. |

(Continued)

FOREIGN PATENT DOCUMENTS

| | | |
|---|---|---|
| DE | 4305192 A1 | 8/1993 |
| DE | 102009011865 A1 | 9/2010 |

(Continued)

*Primary Examiner* — Minh Truong
(74) *Attorney, Agent, or Firm* — Rankin, Hill & Clark LLP

(57) ABSTRACT

An industrial truck (2) with a lift mast (4), a hydraulic system (10), and a method for operating a hydraulic system (10). The lift mast (4) of the industrial truck (2) is driven by a mast lift cylinder (12) and includes at least one mast lift stage (42). A free lift stage is present that is driven by a free lift cylinder (8) with which a load receiving means (6) can be displaced along the lift mast (4). The industrial truck (2) includes a hydraulic system (10) for supplying the at least one mast lift cylinder (12) and the at least one free lift cylinder (8) with a hydraulic fluid (14). The hydraulic system (10) is configured to at least at times simultaneously actuate the at least one mast lift cylinder (12) and the at least one free lift cylinder (8) in load lifting operation and/or in load lowering operation.

9 Claims, 4 Drawing Sheets

(56) References Cited

U.S. PATENT DOCUMENTS

| | | | |
|---|---|---|---|
| 2011/0139546 | A1 | 6/2011 | Look |
| 2018/0170733 | A1 | 1/2018 | Leichnitz et al. |
| 2018/0170732 | A1 | 6/2018 | Stolten |

FOREIGN PATENT DOCUMENTS

| | | | |
|---|---|---|---|
| DE | 102016103256 | A1 | 6/2017 |
| DE | 102016124504 | A1 | 6/2018 |
| EP | 1600420 | A1 | 11/2005 |
| EP | 2465812 | A1 | 6/2012 |
| EP | 1593645 | B1 | 8/2012 |
| WO | 2009141242 | A1 | 11/2009 |

INDUSTRIAL TRUCK, HYDRAULIC SYSTEM FOR AN INDUSTRIAL TRUCK AND METHOD FOR OPERATING A HYDRAULIC SYSTEM

CROSS-REFERENCE TO RELATED APPLICATIONS

This application is a continuation of U.S. application Ser. No. 16/132,568, filed Sep. 17, 2018, and claims priority to DE 10 2017 121 818.1, filed Sep. 20, 2017.

BACKGROUND OF THE INVENTION

Field of Invention

The invention relates to an industrial truck with a lift mast with at least one mast lift stage driven by at least one mast lift cylinder and with a free lift stage driven by at least one free lift cylinder with which a load receiving means can be moved along the lift mast. Furthermore, the invention relates to a hydraulic system for an industrial truck with a lift mast with at least one mast lift stage and with a free lift stage with which a load receiving means can be moved along the lift mast, wherein the hydraulic system comprises at least one mast lift cylinder for driving the at least one mast lift stage and at least one free lift cylinder for driving the at least one free lift stage. The invention also relates to a method for operating a hydraulic system of an industrial truck with a lift mast with at least one mast lift stage and with a free lift stage with which a load receiving means can be moved along the lift mast, wherein the hydraulic system comprises at least one mast lift cylinder from driving the at least one mast lift stage and at least one free lift cylinder for driving the free lift stage.

Brief Description of Related Art

Industrial trucks, such as for example forklifts, frequently have a lift mast with one or more mast lift stages that are hydraulically actuated by a mast lift cylinder or multiple mast lift cylinders. The lift mast comprises a stationary mast firmly connected to the vehicle and typically two extensible masts, one central mast and one inner mast, that are extended by the mast lift cylinder. A free lift cylinder moves a free lift stage with which a load receiving means, for example a fork, can be displaced along the inner mast of the lift mast. The free lift stage moves the load receiving means along the mast stage and allows the operator of the industrial truck to displace the load receiving means heightwise without extending the lift mast and accordingly changing the overall height of the industrial truck.

Known forklifts have a common hydraulic lowering branch for the mast lift and the free lift in which a lowering valve is integrated. The individual mast lift stages and the free lift have hydraulic cylinders with different cross-sections so that, when the load receiving means is lowered, the mast lift stages and the free lift retract in the desired sequence. If multiple mast stages are extended, first those mast stages, the effective hydraulic cross-section of which is in sum the smallest, retract in load lowering operation of the industrial truck. The greatest hydraulic pressure is applied namely to this hydraulic cylinder so that it retracts first when the hydraulic pressure sinks. This is usually the uppermost mast lift stage. As the hydraulic pressure continues to sink, the mast stages are lowered serially, i.e., one after the other. Finally, after the mast stages are completely retracted, the free lift stage retracts and lowers the load receiving means.

BRIEF SUMMARY OF THE INVENTION

It is an object of the invention to provide an industrial truck with a lift mast with at least one mast lift stage and with a free lift stage, a hydraulic system for such an industrial truck as well as a method for operating a hydraulic system of an industrial truck, wherein retracting the at least one mast lift stage and the free lift stage in load lowering operation should be faster than has been possible up to now.

The object is solved by an industrial truck with a lift mast with at least one mast lift stage driven by at least one mast lift cylinder and with one free lift stage driven by at least one free lift cylinder with which a load receiving means can be displaced along the lift mast, wherein the industrial truck is developed by a hydraulic system for supplying the at least one mast lift cylinder and the at least one free lift cylinder with a hydraulic fluid, wherein the hydraulic system is configured to at least at times simultaneously actuate the at least one mast lift cylinder and the at least one free lift cylinder in load lifting operation and/or in load lowering operation.

Advantageously, in the case of such an industrial truck, the mast lift stages and the load receiving means are retracted and/or extended simultaneously. Through the synchronous, i.e., at least at times simultaneous, actuation of the at least one mast lift cylinder and the at least one free lift cylinder, the lowering time of the industrial truck can be reduced. This increases the handling capacity of the industrial truck. This applies provided that the industrial truck accesses heights that are reachable with the lift mast at least partially extended. In lifting operation, a jerky transition between free lift and mast lift can be avoided.

An industrial truck or also a floor conveyor is a transport means for transporting goods which is usually used in-house and on flat ground, for example a stacker.

Ideally, according to aspects of the invention, when the load receiving means is brought down in load lowering operation from the maximum height during the synchronous lowering process, the industrial truck is faster by the time span that is usually required for retracting the load receiving means with the free lift stage. The extending process, i.e., raising the load receiving means to the maximum height, is more homogeneous and smoother than before. This improves the handling of the industrial truck.

According to an advantageous embodiment, the industrial truck is developed in that the hydraulic system comprises separate hydraulic return lines for unloading the at least one mast lift cylinder and the at least one free lift cylinder in load lowering operation.

The separate hydraulic return lines can accelerate the lowering of the load receiving means by simultaneously retracting the mast stage(s) and the free lift stage. The separate hydraulic return lines can simultaneously unload the mast lift cylinder and the free lift cylinder. This also applies when the mast lift cylinder and the free lift cylinder or respectively the mast lift cylinder of the individual mast lift stages have different cross-sections so that they extend serially, i.e., one after the other, in load lifting operating. If only a single hydraulic line were used to also unload the lift cylinders, it would be necessary that the retraction of the mast lift cylinder and of the free lift would take place in the opposite sequence as the extension. Advantageously, this is no longer the case.

In particular, the industrial truck is further developed in that the hydraulic system comprises a first hydraulic return line that runs between the at least one free lift cylinder and a reservoir for the hydraulic fluid, and the hydraulic system further comprises a second hydraulic return line that runs between the at least one mast lift cylinder and the reservoir, wherein a first lowering valve is integrated in the first return line and a second lowering valve is integrated in the second return line.

In particular, it is also provided that the first lowering valve and the second lowering valve can be activated separately, i.e., independently of each other. In this way, it is possible to lower the mast lift stage(s) and/or the load receiving means separately and independently of each other in load lowering operation.

According to another advantageous aspect, the industrial truck is developed by a control that is configured to open the lowering valves simultaneously in load lowering operation when the load receiving means is being lowered. Opening both lowering valves lowers the mast lift stage(s) and the load receiving means simultaneously at least at the beginning of the process. The load receiving means is lowered particularly quickly.

In particular, it is further provided that the lowering valves are proportional valves and the control is further configured to control or regulate a first volumetric flow through the first lowering valve and a second volumetric flow through the second lowering valve so that the at least one mast lift stage and the load receiving means reach a lower end position at least approximately simultaneously in load lowering operation when the load receiving means is being lowered.

According to this aspect, a homogeneous and comparable behavior of the industrial truck can be achieved when the load lifting means is lowered from different lifting heights. This facilitates the usability of the industrial truck. In addition, an even lowering speed of the load receiving means can be achieved over the entire lowering process.

In order to provide a corresponding regulation, a displacement sensor, for example, is provided on the mast lift and on the free lift so that the respective speed with which the mast lift or respectively the free lift are extended or respectively retracted can be determined. Starting from this measured value, a regulation is possible with which an even and homogeneous lowering process can be achieved, in particular so that the mast lift stage and the load receiving means reach their lower end position at least approximately simultaneously.

In particular, the industrial truck is further developed in that the hydraulic system comprises a hydraulic pump that is integrated in a hydraulic feed line and is configured to apply the at least one mast lift cylinder and the at least one free lift cylinder to pressurized hydraulic fluid in load lifting operation, wherein the hydraulic feed line branches between the hydraulic pump and the lift cylinders into a first and a second supply branch and the first supply branch runs to the free lift cylinder and the second supply branch runs to the mast lift cylinder, wherein a lifting valve designed as a proportional valve is integrated in the hydraulic feed line with which a ratio between the volumetric flow in the first and in the second supply branch can be changed.

According to this aspect, not only is an at least at times simultaneous retraction of the lift mast or respectively the mast lift stages and the free lift stage in load lowering operation possible, but an at least at times simultaneous extension of the lift mast and the free lift stage during load lifting operation is also possible. In this manner, the handling and usability of the industrial truck can be improved further in addition to the handling capacity.

According to another advantageous aspect, it is provided that the free lift cylinder has a first cross-section and the lift cylinder has a second cross-section, wherein the first cross-section is larger than the second cross-section and the lifting valve is integrated in the first supply branch. The arrangement of the lifting valve in the first supply branch is advantageous, since the effective hydraulic flow cross-section of the first supply branch can be decreased by means of the lifting valve. In this way, it is possible that the free lift cylinder and the lift cylinder can be simultaneously extended by correspondingly selecting or setting the effective hydraulic flow cross-section of this supply branch.

The industrial truck is further developed by a control that is configured to activate the lifting valve such that the free lift cylinder and the mast lift cylinder can be at least at times simultaneously extended in load lifting operation. In particular, it is provided that the control is configured to activate the lifting valve such that a smooth transition between free lift and mast lift is achieved.

In particular, the control or control unit is a part of the operation control or operation control unit of the industrial truck.

The object is also solved by a hydraulic system for an industrial truck with a lift mast with at least one mast lift stage and with a free lift stage with which a load receiving means can be displaced along the lift mast, wherein the hydraulic system comprises at least one mast lift cylinder for driving the at least one mast lift stage and at least one free lift cylinder for driving the at least one free lift stage, wherein the hydraulic system is developed in that it is configured to at least at times simultaneously supply the at least one mast lift cylinder and the at least one free lift cylinder with a hydraulic fluid in load lifting operation and/or in load lowering operation.

The same or similar advantages apply to the hydraulic system as were previously mentioned with respect to the industrial truck. The hydraulic system allows an industrial truck to be provided in which the load receiving means can be lowered more quickly than previously. Accordingly, with the assistance of the hydraulic system according to aspects of the invention, it is possible to equip the industrial truck so that it attains a higher handling capacity. The hydraulic system is interesting and advantageous, especially with respect to the possible upgrade or retrofitting of existing industrial vehicles.

According to an advantageous aspect, it is provided that the hydraulic system is developed in that it comprises a first hydraulic return line that runs between the at least one free lift cylinder and a reservoir for the hydraulic fluid and the hydraulic system further comprises a second separate hydraulic return line that runs between the at least one mast lift cylinder and the reservoir, wherein a first lowering valve is integrated in the first return line and a second lowering valve is integrated in the second return line.

In particular, it is further provided that the hydraulic system further comprises a hydraulic pump that is integrated in a hydraulic feed line and is configured to apply the at least one mast lift cylinder and the at least one free lift cylinder to pressurized hydraulic fluid, wherein the hydraulic feed line branches between the hydraulic pump and the lift cylinders into a first and a second supply branch and the first supply branch runs to the free lift cylinder and the second supply branch runs to the mast lift cylinder, wherein a lifting valve designed as a proportional valve is integrated in the hydraulic feed line with which a ratio between the volumetric flows in the first and in the second supply branch can be changed.

The object is also solved by a method for operating a hydraulic system of an industrial truck with a lift mast with at least one mast lift stage and with a free lift stage with which a load receiving means can be displaced along the lift mast, wherein the hydraulic system comprises at least one mast lift cylinder for driving the at least one mast lift stage and at least one free lift cylinder for driving the free lift stage, wherein the hydraulic system is developed in that it is operated such that the at least one mast lift cylinder and the at least one free lift cylinder are at least at times simultaneously actuated in load lifting operation and/or in load lowering operation.

The same or similar advantages also apply to the method for operating the hydraulic system as were previously mentioned with respect to the industrial truck or also with respect to the hydraulic system.

According to an advantageous aspect, the method is developed in that the hydraulic system comprises a first hydraulic return line that runs between the at least one free lift cylinder and a reservoir for the hydraulic fluid and the hydraulic system further comprises a separate second hydraulic return line that runs between the at least one mast lift cylinder and the reservoir, wherein a first lowering valve is integrated in the first return line and a second lowering valve is integrated in the second return line, and wherein the first lowering valve and the second lowering valve are opened simultaneously in load lowering operation when the load receiving means are let down.

In another aspect, it is provided that the lowering valves are proportional valves and a first volumetric flow through the first lowering valve and a second volumetric flow through the second lowering valve are controlled or regulated so that the at least one mast lift stage and the load receiving means reach a lower end position at least approximately simultaneously when the load receiving means is lowered.

Furthermore, the method is advantageously further developed in that the hydraulic system comprises a hydraulic pump that is integrated in a hydraulic feed line and with which the at least one mast lift cylinder and the at least one free lift cylinder are exposed to pressurized hydraulic fluid in load lifting operation, wherein the hydraulic feed line branches between the hydraulic pump and the lift cylinders into a first and a second supply branch and the first supply branch runs to the free lift cylinder and the second supply branch runs to the mast lift cylinder, wherein a lifting valve designed as a proportional valve, with which a ratio between a volumetric flow in the first and in the second supply branch can be changed, is integrated in the hydraulic feed line, wherein the free lift cylinder has a first cross-section and the mast lift cylinder has a second cross-section, wherein the first cross-section is larger than the second cross-section and the lifting valve is integrated in the first supply branch, and wherein the lifting valve is activated such that the free lift cylinder and the mast lift cylinder are at least at times simultaneously extended.

According to another aspect, it is provided that, depending on an operating mode of the industrial truck and/or depending on a preselected lifting height of the load receiving means, the lifting valve is brought in a first position for a sequential extension of the free lift cylinder and of the mast lift cylinder or in a second position for an at least at times simultaneous extension.

The corresponding operating mode can, for example, be selected manually. However, it is also provided that a corresponding operating mode in which the mast lift stage and the free lift stage are simultaneously displaced is selected, when, for example, a lifting height is entered manually that lies outside of the range that can be reached exclusively by means of the free lift.

Further features of the invention will become apparent from the description of the embodiments according to the invention together with the claims and the attached drawings. Embodiments according to the invention can fulfill individual features or a combination of several features.

BRIEF DESCRIPTION OF THE DRAWINGS

The invention is described below, without restricting the general idea of the invention, using exemplary embodiments with reference to the drawings, wherein express reference is made to the drawings with regard to all details according to the invention that are not explained in greater detail in the text. In the figures.

In the drawings, in each case the same or similar elements and/or parts are provided with the same reference numbers, so that in each case a repeated introduction is omitted.

DETAILED DESCRIPTION OF THE INVENTION

Figure 1:
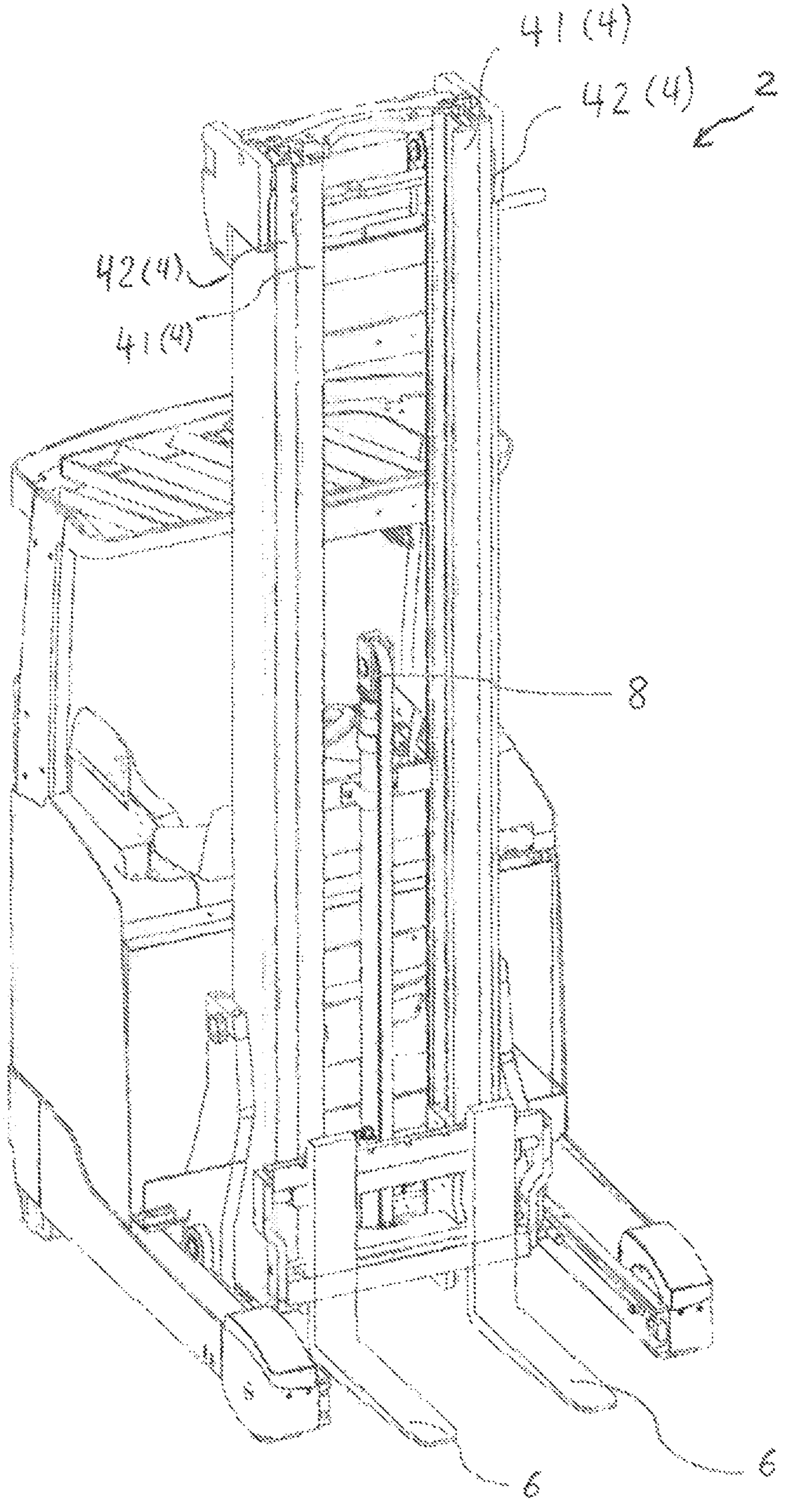
FIG. 1 shows an industrial truck in a schematically simplified perspective view.

FIG. 1 shows an industrial truck 2, as an example a forklift, with a lift mast 4, comprising, as an example, a first mast lift stage 41, the inner mast, and a second mast lift stage 42, the central mast. The lift mast 4 is driven by a mast lift cylinder (not shown in FIG. 1) (multiple mast lift cylinders can also be provided). The lift mast 4 comprises, in addition to the inner mast and the central mast, a stationary mast firmly connected to the vehicle frame. The central mast is driven, as an example, by the mast lift cylinder; the inner mast is also coupled, as an example, via a chain with the central mast so that these two extensible masts extend simultaneously. Furthermore, the industrial truck 2 comprises a free lift stage with a load receiving means 6, as an example a fork, that can be displaced along the inner mast of the lift mast 4. For this purpose, the free lift stage comprises a free lift cylinder 8. The free lift cylinder 8 can displace the load receiving means 6 along the first mast stage 41 of the lift mast 4.

Figure 2:
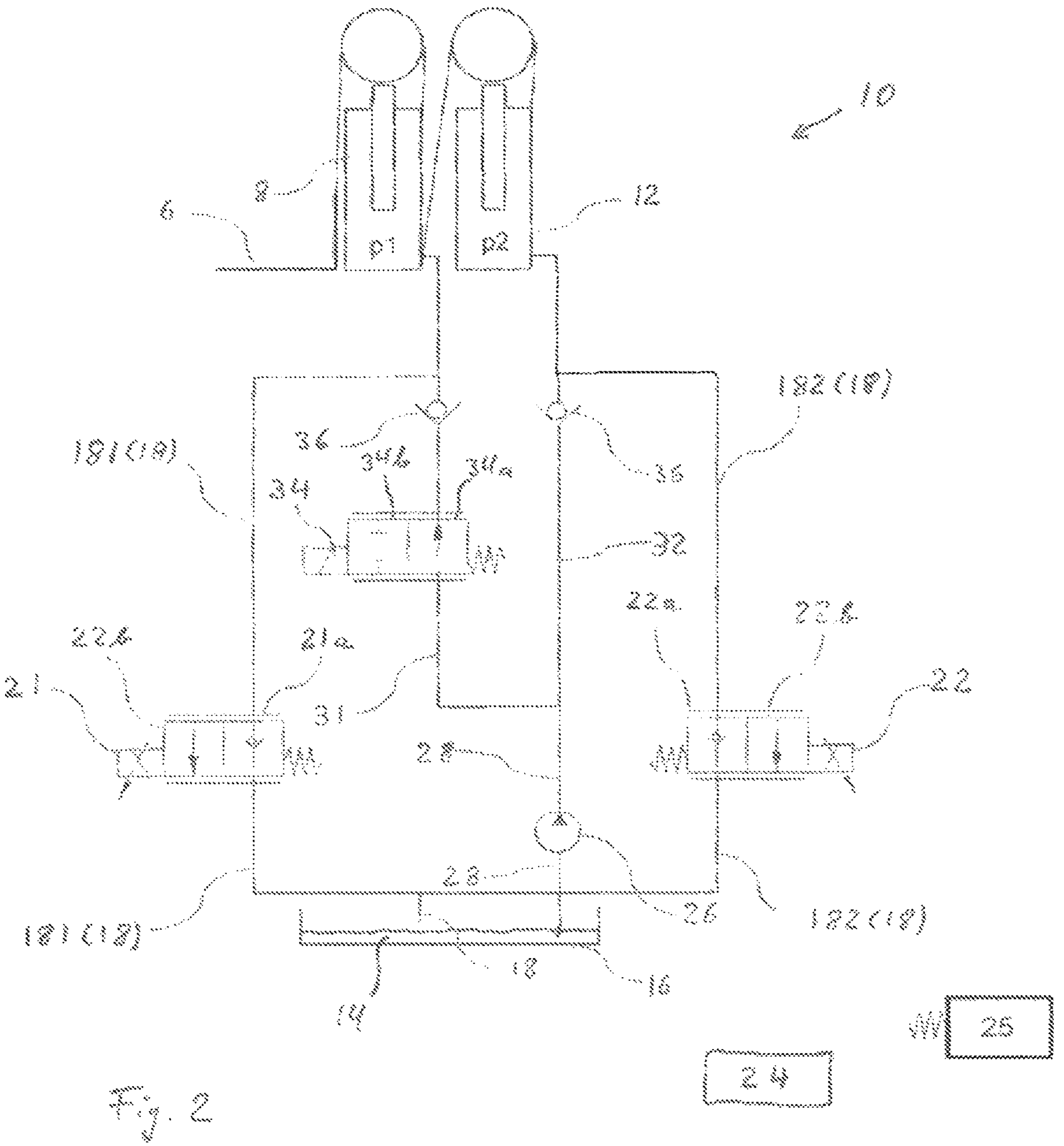
FIG. 2 shows a schematic circuit diagram of a hydraulic system.

FIG. 2 shows a schematic circuit diagram of a hydraulic system 10 as it is integrated in the industrial truck 2 according to an exemplary embodiment. The hydraulic system 10 serves to supply a mast lift cylinder 12 and the free lift cylinder 8, with which the load receiving means 6 is displaced, with a hydraulic fluid 14. The hydraulic fluid is taken from a reservoir 16 and is also returned to it again. The hydraulic system 10 is configured to at least at times simultaneously operate the mast lift cylinder 12 and the free lift cylinder 8 in load lifting operating and/or in lowering operation.

In the exemplary embodiment shown, the hydraulic system 10 is configured to simultaneously actuate the mast lift cylinder 12 and the free lift cylinder 8 in load lifting operation, i.e., when raising the load receiving means 6, as well as in load lowering operation, i.e., when lowering the load receiving means 6.

The hydraulic system 10 comprises separate hydraulic return lines 18. A first hydraulic return line 181 runs between the free lift cylinder 8 and the reservoir 16. Furthermore, a second hydraulic return line 182 is comprised that runs between the mast lift cylinder 12 and the reservoir 16. A first lowering valve 21 is integrated in the first return line 181 and a second lowering valve 22 is integrated in the second return line 182. The lowering valves 21, 22 are, for example, proportional valves. These can be switched between a first switching position 21*a*, 22*a*, in which the lowering valves 21, 22 work as non-return valves, and a second switching position 21*b*, 22*b* In the second switching position 21*b*, 22*b*, the lowering valves 21, 22 are configured to control or regulate a first volumetric flow or respectively a second volumetric flow. In this way, the first lowering valve 21 controls or regulates a first volumetric flow through the first return line 181, while the second lowering valve 22 controls or regulates a second volumetric flow through the second return line 182. The lowering valves 21, 22 can be activated separately from each other. For controlling and/or regulating, a control 24 of the hydraulic system is comprised which activates the two lowering valves 21, 22 via connecting lines (not shown).

The control 24 is configured or respectively programmed such that the lowering valves 21, 22 open simultaneously in a load lowering operation, i.e., when lowering the load receiving means 6. In this way, the free lift cylinder 8 of the free lift stage and the mast lift cylinder 12 of the lift mast 4 are retracted simultaneously. As a result, the load receiving means 6 actuated by the free lift stage sinks along the first mast lift stage 41, while the lift mast 4, i.e., the first and the second mast lift stage 41, 42, simultaneously retract.

Figure 3A:
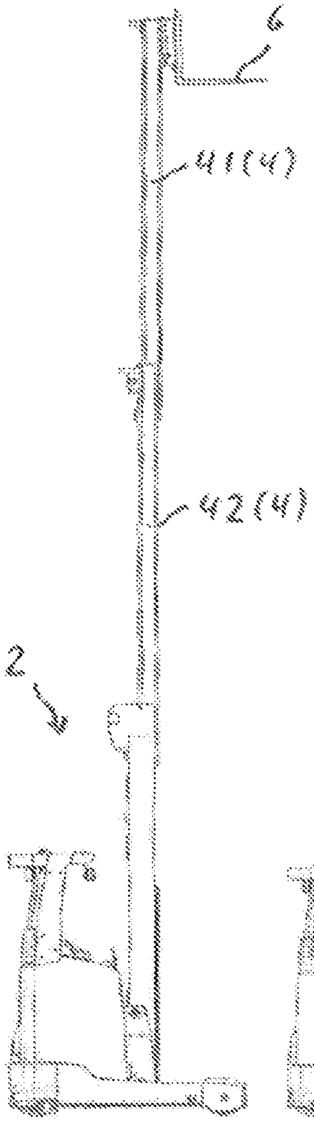
FIG. 3A to 3D show a lowering process of a load receiving means in an industrial truck according to the prior art from a maximum height that can be reached with this industrial truck.

This novel process is explained with reference to a comparison of FIGS. 3 and 4. FIG. 3A to 3D show a lowering process of a load receiving means 6 as it takes place in the case of an industrial truck according to the prior art. FIG. 3A shows the industrial truck 2 with the lift mast 4 completely extended. The load receiving means 6 is located at the upper stop of the first mast lift stage 41. A conventional industrial truck 2 comprises a common return line with which both the free lift cylinder 8 and the mast lift cylinder 12 are unloaded of pressure.

Figure 3B:
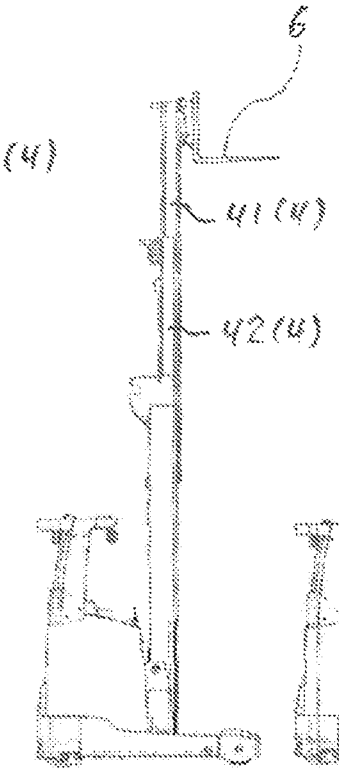
Figure 3C:
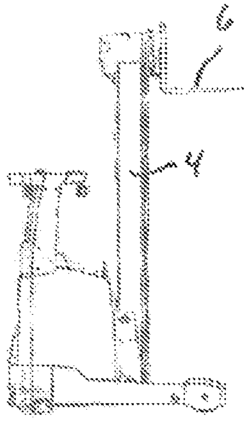
Figure 3D:
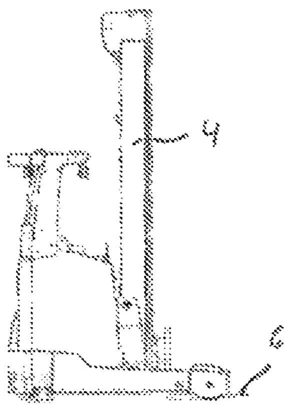

The free lift cylinder 8 and the mast lift cylinder 12 have different cross-sections. These are chosen so that first the free lift cylinder 8 extends in the case of a first pressure p1 (cf. FIG. 2) of the hydraulic fluid 14. If the free lift stage reaches the upper stop of the lift mast 4, more precisely of the first mast lift stage 41 (FIG. 3C shows this situation), the pressure of the hydraulic fluid 14 in the hydraulic system 10 continues to rise until it reaches the value p2, which is greater than p1. The mast lift stages 41, 42 begin to extend when the hydraulic pressure p2 is exceeded. The individual mast lift cylinders 12 of the mast lift stages 41, 42 can in turn be designed so that their different cross-sections ensure that first the first mast lift stage 41 and then the second mast lift stage 42 extends.

In the exemplary embodiment shown in FIG. 3, the two mast lift stages 41, 42 retract approximately simultaneously. When the hydraulic fluid 14 is discharged, the lift mast 4 and the free lift stage retract in the opposite sequence. Starting from a situation with the lift mast 4 maximally extended and a load lifting means 6 at the upper stop of the first mast lift stage 41 (cf. FIG. 3A), first the lift mast 4 retracts (cf. FIG. 3B). Since the pressure lies above p1 as before, the free lift stage and accordingly the load receiving means 6 remains at the upper stop until the lift mast 4 is completely retracted (cf. FIG. 3C). The free list stage only also retracts and the load receiving means 6 sinks onto the lower stop when the hydraulic pressure in the hydraulic system 10 then sinks further, i.e., below the value of p1.

Figures 4A, 4B, 4C:
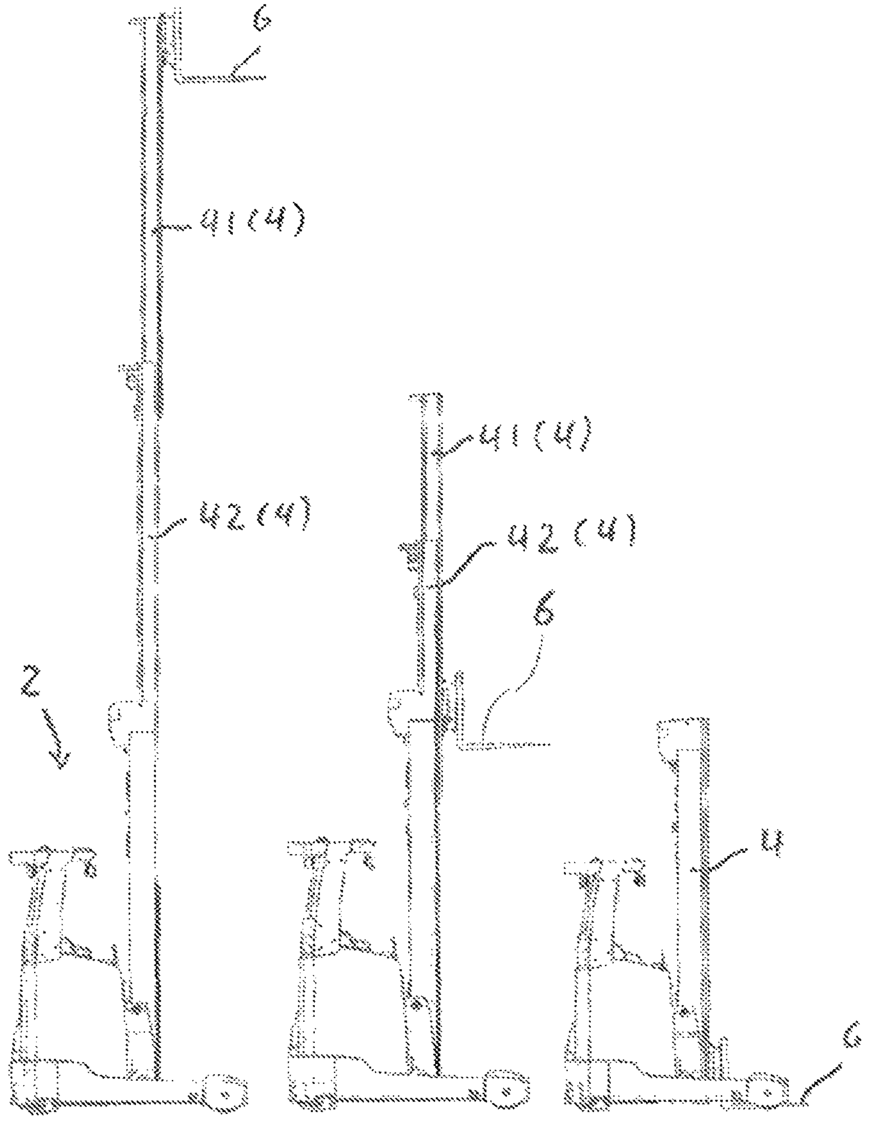
FIG. 4A to 4C show a lowering process of a load receiving means from a maximum height that can be reached with the industrial truck in the case of an industrial truck according to an exemplary embodiment.

FIG. 4A to 4C show a lowering process of a load receiving means 6 of an industrial truck 2 according to an exemplary embodiment.

FIG. 4A shows the industrial truck 2 with the lift mast 4 completely extended, wherein the load receiving means 6 is also located at the upper stop of the first mast lift stage 41. This situation is identical to the one shown in FIG. 3A. In load lowering operation, in the case of the industrial truck 2 shown in FIG. 4, the free lift stage and the mast lift stages 41, 42 are synchronously lowered by simultaneously opening the first and second lowering valve 21, 22 (cf. FIG. 2). FIG. 4B shows the industrial truck 2 after a first time interval after which the conventional industrial truck 2 in FIG. 3B is also shown. In contrast to the conventional industrial truck 2 in FIG. 3B, in the case of the industrial truck 2 according to an exemplary embodiment in FIG. 4B, the load receiving means 6 has already arrived at the lower stop of the first mast lift stage 41. It is accordingly already located much lower than the load receiving means 6 in the case of the conventional industrial truck 2. During another time interval, the lift mast 4 sinks in completely and the load receiving means 6 reaches the lowest stop (FIG. 4C). With a conventional industrial truck 2 (cf. FIG. 3C), after this time interval the load receiving means 6 is still located at the upper stop of the first mast lift stage 41.

As a comparison of FIGS. 3 and 4 shows, with the industrial truck 2 according to an exemplary embodiment, the load receiving means 6 is lowered considerably faster. Exactly that time interval is saved which the load receiving means 6 needs in the case of a conventional industrial truck 2 to be lowered along a mast lift stage 41, 42.

According to another exemplary embodiment, it is provided that the control 24 is configured such that the lowering of the lift mast 4 and the free lift stage which moves the load receiving means 6 is controlled or regulated so that the mast lift stages 41, 42 and the load receiving means 6 reach the lower stop at least approximately simultaneously. In order to provide for such regulation, a displacement sensor 25 (see FIG. 2) is provided (e.g., on the mast lift and on the free lift) so that the respective speed with which the mast lift or respectively the free lift are extend or respectively retracted can be determined. Starting from this measured value, a regulation is possible with which an even and homogenous lowering process can be achieved, in particular so that the mast lift stage and the load receiving means reach their lower end position at least approximately simultaneously. In this way, a homogeneous lowering process can be achieved, which simplifies the operation of the industrial truck 2 for the operator.

In order to be able to raise the load receiving means 6 in load lifting operation, the hydraulic system 10 of the industrial truck 2 comprises a hydraulic pump 26 that takes hydraulic fluid 14 out of the reservoir 16 via a hydraulic feed line 28. The hydraulic pump 26 is integrated in the hydraulic feed line 28. In load lifting operation, the hydraulic pump 26 serves to apply the mast lift cylinder 12 and the free lift cylinder 8 with pressurized hydraulic fluid 14.

The hydraulic feed line 28 branches between the hydraulic pump 26 and the lift cylinders, i.e., the free lift cylinder 8 and the mast lift cylinder 12, into a first supply branch 31 and into a second supply branch 32. The first supply branch 31 leads to the free lift cylinder 8; the second supply branch 32 leads to the mast lift cylinder 12. The two supply branches 31, 32 are also considered as part of the hydraulic feed line 28. A lifting valve 34, which can be designed as a proportional valve, is integrated into the first supply branch 31. The lifting valve 34 can also, like the hydraulic pump 26, be controlled or regulated via the control 24.

A ratio between the volumetric flows in the first and second supply branch 31, 32 can be changed via the settings of the lifting valve 34. The free lift cylinder 8 has a first cross-section and the mast lift cylinder 12 has a second cross-section, wherein the first cross-section is larger than the second cross-section. For this reason, the free lift cylinder 8 is activated at a first pressure p1, wherein the pressure p1 is smaller than the pressure p2 at which the mast lift cylinder 12 is activated. The effective hydraulic flow cross-section of the lift cylinders 8, 12 can be variably set via the settings of the lifting valve 34 so that it is possible to extend both lift cylinders 8, 12 simultaneously. This occurs in the first switching position **34*a* of the lifting valve 34. In the second switching position 34*b*, the free lift can be blocked so that exclusively the mast lift cylinder 12 is actuated. It is also possible, by dynamically setting the lift valve 34, to achieve a gentle transition between a lift of the load receiving means 6 effected by the free lift cylinder 8 and a lift of same caused by the mast lift cylinder 12**.

In order to prevent the hydraulic fluid 14 from flowing back in the first and second supply branch 32, 32, a non-return valve 36 is integrated into each respective supply branch.

An named features, including those taken from the drawings alone as well as individual features that are disclosed in combination with other features, are considered, alone and in combination, to be essential for the invention. Embodiments according to the invention can be fulfilled by individual features or a combination of several features. In the scope of the invention, features which are designated with “in particular” or “preferably” are optional features.

REFERENCE SIGN LIST

2 Industrial truck
4 Lift mast
6 Load receiving means
8 Free lift cylinder
10 Hydraulic system
12 Mast lift cylinder
14 Hydraulic fluid
16 Reservoir
18 Hydraulic return line
21 First lowering valve
22 Second lowering valve
21A, **22*a*, 34*a*** First switching position
**21*b*, 22*b*, 34*b*** Second circuit
24 Control
25 Displacement sensor
26 Hydraulic pump
28 Feed line
31 First supply branch
32 Second supply branch
34 Lifting valve
36 Non-return valve
41 First mast lift stage
42 Second mast lift stage
181 First hydraulic return line
182 Second hydraulic return line

The invention claimed is:

1. An industrial truck comprising:

a lift mast comprising at least one mast lift stage driven by at least one mast lift cylinder, and a free lift stage having a load receiving means driven by at least one free lift cylinder such that the load receiving means is displaceable along the lift mast; and a hydraulic system for supplying a hydraulic fluid to and for unloading the hydraulic fluid from the at least one mast lift cylinder and the at least one free lift cylinder;

wherein the hydraulic system comprises a control programmed to actuate the at least one mast lift cylinder and the at least one free lift cylinder in a load lowering operation such that the mast lift stage and the free lift stage are simultaneously retracted, wherein the hydraulic system comprises separate hydraulic return lines for unloading the at least one mast lift cylinder and the at least one free lift cylinder in the load lowering operation, wherein the hydraulic system comprises a first hydraulic return line that runs between the at least one free lift cylinder and a reservoir for the hydraulic fluid, wherein the hydraulic system further comprises a second hydraulic return line that runs between the at least one mast lift cylinder and the reservoir, wherein a first lowering valve is integrated in the first return line, wherein a second lowering valve is integrated in the second return line, wherein the control is programmed to open the first and the second lowering valve simultaneously at the start of the load lowering operation when the load receiving means is lowered and the mast lift stage and the free lift stage start simultaneous retraction, wherein the lift truck further comprises a displacement sensor provided on the mast lift stage and on the free lift stage for determining a measured value of respective retraction speeds of the mast lift stage and the free lift stage, and wherein the first and second lowering valves are proportional valves and the control is further programmed to control or regulate a first volumetric flow through the first lowering valve and a second volumetric flow through the second lowering valve such that, based on the measure value, the at least one mast lift stage and the load receiving means reach a lower end position at least approximately simultaneously in the end of the load lowering operation, when the load receiving means is completely lowered.

2. The industrial truck according to claim 1, wherein the hydraulic system comprises a hydraulic pump that is integrated in a hydraulic feed line and is configured to apply pressurized hydraulic fluid to the at least one mast lift cylinder and the at least one free lift cylinder in the load lifting operation, wherein the hydraulic feed line branches between the hydraulic pump and the lift cylinders into a first and a second supply branch, wherein the first supply branch runs to the free lift cylinder and the second supply branch runs to the mast lift cylinder, and wherein a lifting valve designed as a proportional valve is integrated in the hydraulic feed line with which a ratio between the volumetric flows in the first and in the second supply branch is changeable.

3. The industrial truck according to claim 2, wherein the free lift cylinder has a first cross-section and the lift cylinder has a second cross-section, wherein the first cross-section is larger than the second cross-section, and wherein the lifting valve is integrated in the first supply branch.

4. The industrial truck according to claim 2, the control is configured to activate the lifting valve such that the free lift cylinder and the mast lift cylinder are simultaneously extendable throughout the load lifting operation.

5. An industrial truck comprising:

a lift mast comprising at least one mast lift stage driven by at least one mast lift cylinder, and a free lift stage having a load receiving means driven by at least one free lift cylinder such that the load receiving means is displaceable along the lift mast; and a hydraulic system for supplying a hydraulic fluid to and for unloading the hydraulic fluid from the at least one mast lift cylinder and the at least one free lift cylinder;

wherein the hydraulic system comprises a control programmed to actuate the at least one mast lift cylinder and the at least one free lift cylinder such that, in a load lowering operation, the mast lift stage and the free lift stage (i) simultaneously start retracting, and (ii) continue to simultaneously retract until one of the mast lift stage and the free lift stage is completely retracted.

6. A method of operating a hydraulic system of an industrial truck that includes a lift mast having at least one mast lift stage driven by at least one mast lift cylinder, a free lift stage having a load receiving means driven by at least one free lift cylinder such that the load receiving means is displaceable along the lift mast, the hydraulic system supplying a hydraulic fluid to and unloading the hydraulic fluid from the at least one mast lift cylinder and the at least one free lift cylinder, a control for the hydraulic system programmed to operate the hydraulic system, and a displacement sensor provided on the mast lift stage and on the free lift stage for determining a measured value of respective retraction speeds of the mast lift stage and the free lift stage, the method comprising:

simultaneously actuating the at least one mast lift cylinder and the at least one free lift cylinder in a load lowering operation via the control for the hydraulic system such that the mast lift stage and the free lift stage are simultaneously retracted; and regulating a first volumetric flow through the first lowering valve and a second volumetric flow through the second lowering valve via the control for the hydraulic system such that, based on the measure value, the at least one mast lift stage and the load receiving means reach a lower end position at least approximately simultaneously at the end of the lowering operation when the load receiving means is completely lowered.

7. The method according to claim 6, wherein the hydraulic system comprises a first hydraulic return line that runs between the at least one free lift cylinder and a reservoir for the hydraulic fluid, wherein the hydraulic system further comprises a separate second hydraulic return line that runs between the at least one mast lift cylinder and the reservoir, wherein a first lowering valve is integrated in the first return line, wherein a second lowering valve is integrated in the second return line, and wherein the method further comprises opening the first lowering valve and the second lowering valve simultaneously via the control for the hydraulic system at the start of the load lowering operation when the load receiving means are let down and the mast lift stage and the free lift stage simultaneously start retracting.

8. The method according to claim 6, wherein the hydraulic system includes a hydraulic pump that is integrated in a hydraulic feed line, wherein the at least one mast lift cylinder and the at least one free lift cylinder are exposed to pressurized hydraulic fluid in the load lifting operation, wherein the hydraulic feed line branches between the hydraulic pump and the lift cylinders into a first and a second supply branch, wherein the first supply branch runs to the free lift cylinder, wherein the second supply branch runs to the mast lift cylinder, wherein a lifting valve in the form of a proportional valve, with which a ratio between a volumetric flow in the first and in the second supply branch is changeable, is integrated in the hydraulic feed line, wherein the free lift cylinder has a first cross-section and the mast lift cylinder has a second cross-section, wherein the first cross-section is larger than the second cross-section, wherein the lifting valve is integrated in the first supply branch, and wherein the method further comprises activating the lifting valve via the control for the hydraulic system such that the free lift cylinder and the mast lift cylinder are simultaneously extended throughout the load lifting operation.

9. A method of operating a hydraulic system of an industrial truck that includes a lift mast having at least one mast lift stage driven by at least one mast lift cylinder, a free lift stage having a load receiving means driven by at least one free lift cylinder such that the load receiving means is displaceable along the lift mast, the hydraulic system supplying a hydraulic fluid to and unloading the hydraulic fluid from the at least one mast lift cylinder and the at least one free lift cylinder, and a control for the hydraulic system programmed to operate the hydraulic system, the method comprising simultaneously actuating the at least one mast lift cylinder and the at least one free lift cylinder via the control for the hydraulic system such that, in a load lowering operation, the mast lift stage and the free lift stage (i) simultaneously start retracting, and (ii) continue to simultaneously retract until one of the mast lift stage and the free lift stage is completely retracted.

* * * * *